United States Patent
Bletscher

(10) Patent No.: US 11,931,940 B2
(45) Date of Patent: Mar. 19, 2024

(54) MOLD-CLOSING UNIT FOR AN INJECTION MOLDING MACHINE, AND METHOD FOR LOCKING A FORCE TRANSMISSION ELEMENT

(71) Applicant: ARBURG GMBH + CO KG, Loßburg (DE)

(72) Inventor: Rainer Bletscher, Baiersbronn (DE)

(73) Assignee: ARBURG GMBH + CO KG, Lossburg (DE)

( * ) Notice: Subject to any disclaimer, the term of this patent is extended or adjusted under 35 U.S.C. 154(b) by 502 days.

(21) Appl. No.: 17/280,402

(22) PCT Filed: Oct. 2, 2019

(86) PCT No.: PCT/EP2019/076748
§ 371 (c)(1),
(2) Date: Mar. 26, 2021

(87) PCT Pub. No.: WO2020/070210
PCT Pub. Date: Apr. 9, 2020

(65) Prior Publication Data
US 2021/0339444 A1 Nov. 4, 2021

(30) Foreign Application Priority Data
Oct. 5, 2018 (DE) ...................... 10 2018 124 608.0

(51) Int. Cl.
*B29C 45/67* (2006.01)
(52) U.S. Cl.
CPC ................. *B29C 45/6707* (2013.01)
(58) Field of Classification Search
None
See application file for complete search history.

(56) References Cited

U.S. PATENT DOCUMENTS 6,261,505 B1 7/2001 Glaesener
9,469,063 B2 10/2016 Watarai et al.

FOREIGN PATENT DOCUMENTS

DE 1529931 A1 5/1970
DE 1554765 A1 7/1970
(Continued)

OTHER PUBLICATIONS

International Search Report dated Dec. 12, 2019 re: Application No. PCT/EP2019/076748, pp. 1-4.

*Primary Examiner* — Armand Melendez
(74) *Attorney, Agent, or Firm* — CANTOR COLBURN LLP

(57) ABSTRACT

The invention relates to a mold-closing unit for an injection molding machine for processing plastics, comprising a mold-moving device for moving the movable mold support into and out of closure of an injection mold. At least one force transmission element is connected to the movable mold support and at its end remote from the movable mold support has a section (14a) which is assigned to the stationary mold support. The stationary mold support (10) is assigned a locking device (15) having a plurality of locking elements (70) which can be moved into interlocking operative connection with the actuatable section (14a). The locking device (15) has at least one actuator (16) which is movable in the closing direction (s-s) and on which, during movement of the actuator, the locking elements (70) are movable transversely to the closing direction (s-s) along a sliding block guide (60) in and out of an interlocking operative connection with the actuatable section (14a). The actuator is at the same time connected to at least one piston (18) of a piston-cylinder unit (17) for applying the closing force.

11 Claims, 12 Drawing Sheets

(56) References Cited

FOREIGN PATENT DOCUMENTS

| | | |
|---|---:|---|
| DE | 1930163 A1 | 12/1970 |
| DE | 2812301 A1 | 11/1978 |
| DE | 3042712 A1 | 6/1982 |
| DE | 3440476 A1 | 7/1986 |
| DE | 4032106 A1 | 5/1991 |
| DE | 10318405 A1 | 11/2003 |
| DE | 102015101570 A1 | 8/2016 |
| EP | 1068060 B1 | 9/2002 |
| EP | 1354689 A1 | 10/2003 |
| EP | 1369218 A1 | 12/2003 |
| EP | 0904918 B1 | 10/2006 |
| WO | 2019129670 A1 | 7/2019 |

Fig. 8 open

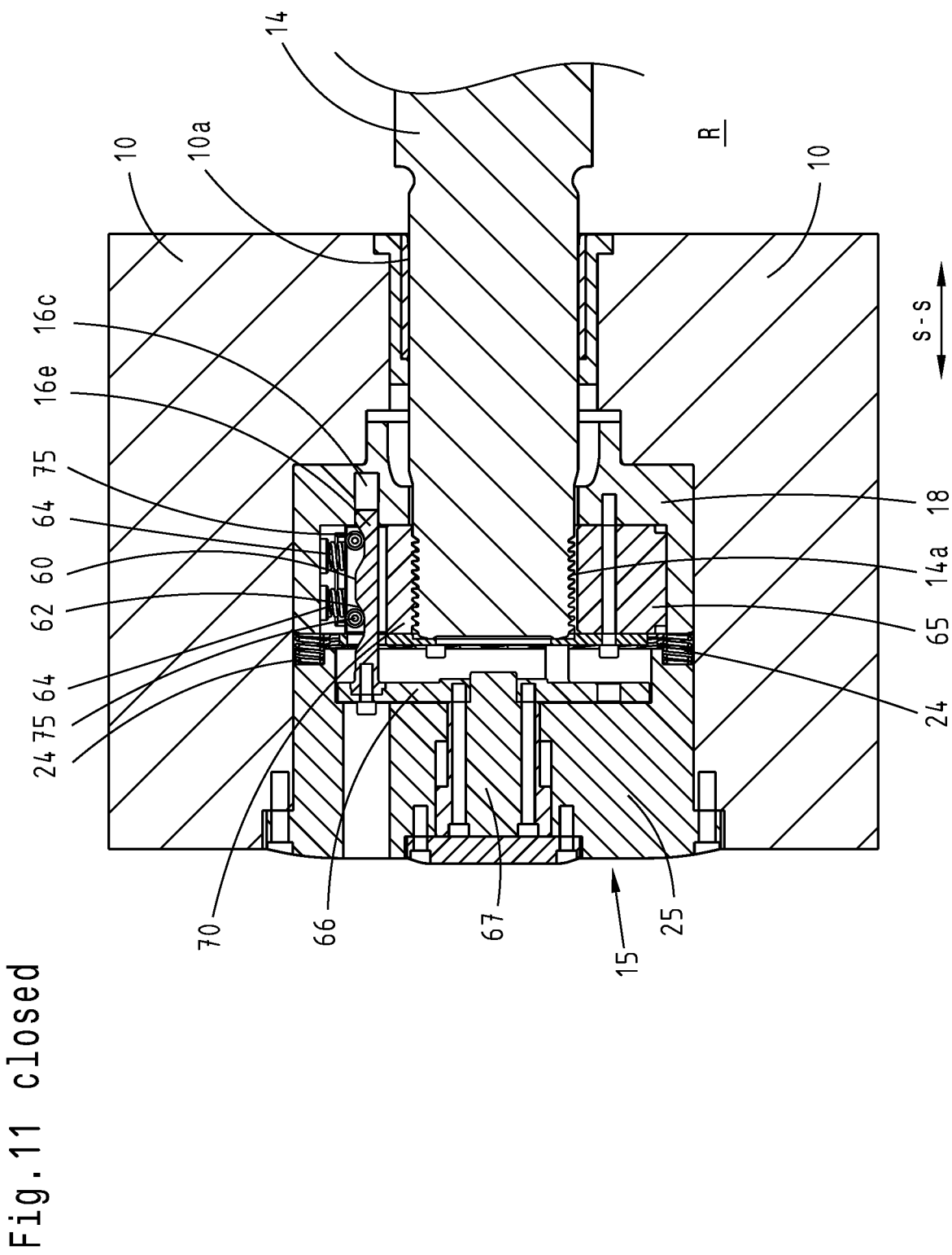
Fig. 11 closed

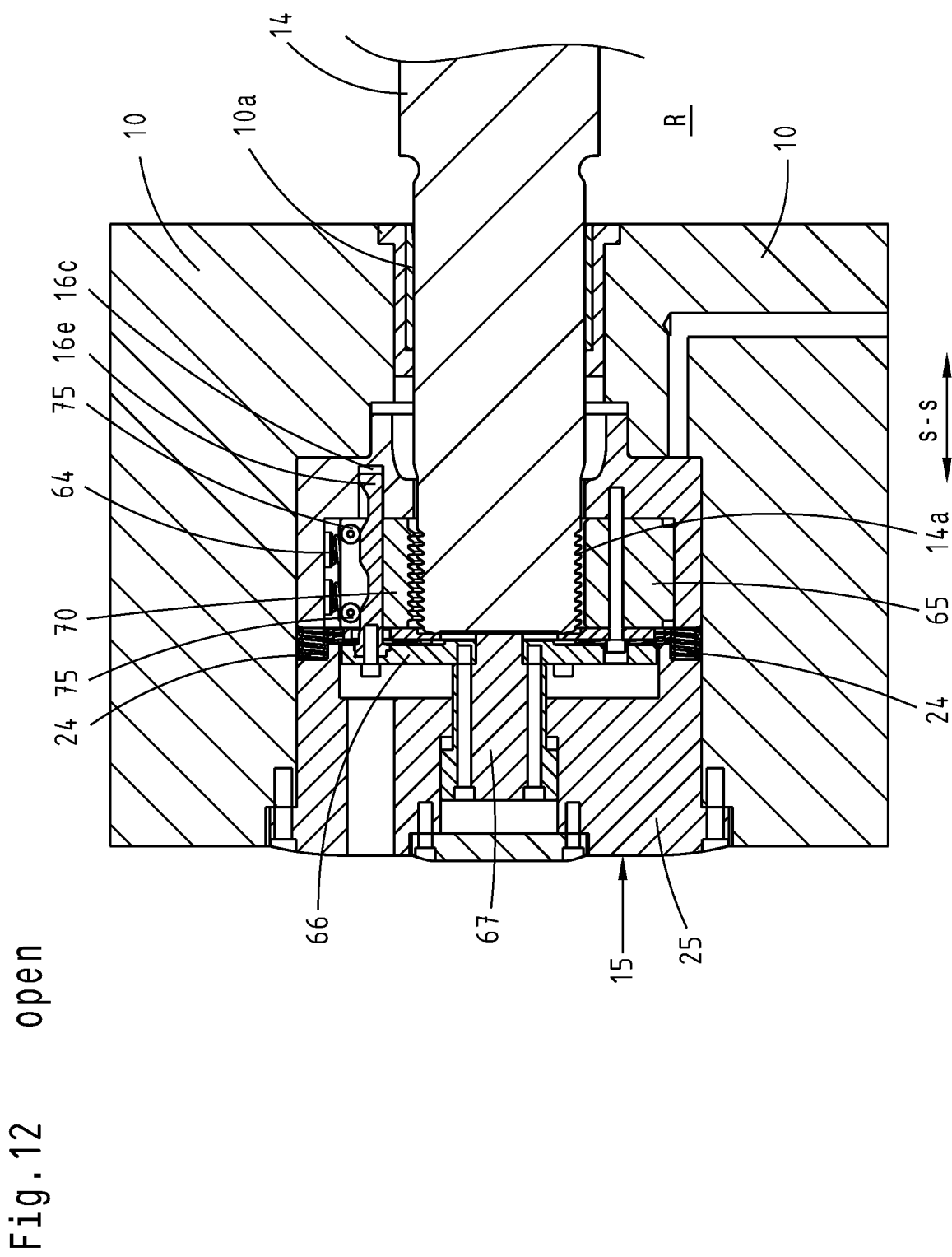
Fig.12 open

MOLD-CLOSING UNIT FOR AN INJECTION MOLDING MACHINE, AND METHOD FOR LOCKING A FORCE TRANSMISSION ELEMENT

CROSS REFERENCE TO RELATED APPLICATIONS

The present application relates to and claims the priority of German patent application 10 2018 124 608.0 filed on Oct. 5, 2018, the disclosure of which is hereby explicitly incorporated by reference into the subject matter of the present application.

TECHNICAL FIELD

The disclosure relates to a mold closing unit for an injection molding machine for processing plasticizable materials, such as plastics, powdery or ceramic materials and to a method for locking a force transmission element to an injection molding machine.

Within the scope of this application, the following terms are used as follows:

The term "mold closure" of an injection mold is understood to mean the condition in which the parts of an injection mold that are secured to mold carriers of the injection molding machine abut against one another. This is typically the case when plasticized material is injected into the mold cavity of the injection mold. A travel movement into and out of mold closure is thus a movement corresponding to opening and closing the injection mold.

The term "mold height" is understood to mean the dimension of the mold as measured in the closing direction, corresponding to the spacing between the movable mold carrier and the stationary mold carrier when the injection mold is closed.

The term "mold height adjusting device" is understood to mean a mechanism that is required to achieve an optimal position of the movable and stationary mold carriers when the injection mold is closed. Taking this position as a starting point, the closing movement is performed and the closing force is built up such that when the injection mold is closed the maximum closing force can be applied. Mold height adjusting devices of this kind are also required when closing paths are optimized, if for example injection molds of different mold heights are used on a single machine.

BACKGROUND

DE 15 54 765 discloses a mold closing unit having a controller for the moving device of a movable mold carrier that is locked to a stationary mold carrier. For this purpose, a locking element that is actuable transversely to the closing direction is articulated to a closing device formed by a piston-and-cylinder unit. When the closing device is actuated, the locking element performs an axial movement in the closing direction, wherein the toothing of the locking element engages with a similar toothing by way of a prolonged unlocking portion transverse to the closing direction.

U.S. Pat. No. 9,469,063 B2 discloses a mold closing device in which a stationary mold carrier and a movable mold carrier are connected to one another by tie bars. Between them, the mold carriers define a mold clamping space for receiving injection molds. Provided on the movable mold carrier side are pistons of closing cylinders, which where necessary engage with actuating portions of the tie bars. For the purpose of locking the tie bar and the movable mold carrier, half nuts are controlled such that they are in operative engagement with the actuable portion, with the result that the closing force can then be applied by a different unit.

EP 0 904 918 B1 discloses a lock of this kind with a bayonet closure. For this, the tie bar has regions in which a closing piston can engage, and regions along which the closing piston, which is movable radially on the guide bar, can slide. Rotating the closing piston brings about a positive engagement, with the result that at the same time at least some of the closing force can also be applied at this piston. The closing force is applied by means of a hydraulic pressure against the surface of the piston. Thus, the clamping arrangement engages in the guide bars and at the same time exerts a pressure on the mold halves during injection molding.

EP 1 068 060 B1 discloses a mold closing unit in which there is provided in the movable region of the mold closing unit a portion in which, when the mold carrier is moved into this region, the support plate is uncoupled such that the support plate can itself be adjusted by the drive in order to make an adjustment to the mold height. However, a precondition of such a solution is the use or structure of a three-plate machine with support plate, movable mold carrier and stationary mold carrier.

DE 103 18 405 A1 discloses an injection molding device having a locking device that has mutually displaceable jaws. When the mold carriers are closed, the jaws are opened so that the tie bars can be introduced. In the closed position, the jaws engage in corresponding webs of a locking part of the tie bars. Then, the required closing pressure is applied using a pressure pad, for example by means of a hydraulic piston-and-cylinder arrangement. Here, the jaws are made to be at least partly resilient, such that the spring load exerts a force in the direction of the locking position of the jaws.

A closing and clamping system that has clamping devices integrated in the movable mold carrier is disclosed in EP 1 369 218 B1. The clamping devices act on a portion of the guide pillars, and in this way lock the movable plate in a closed position. Further, the clamping devices have a plurality of locking inserts, which are displaceably mounted in receptacles in a body integrated in the movable plate and are movable from a non-clamped position into a clamping position. Moreover, the locking inserts have a hole for receiving an eccentric shaft which, on rotation, makes it possible to open and close the clamping devices. In order to enable the clamping devices to be firmly clamped, the receptacles are formed by pistons that can be urged by pressure, together with a cylinder that is integrated in the movable plate.

EP 1 354 689 A1 discloses a hydraulic clamping device for an injection molding machine with mold height adjustment and tie bar devices that have a clamping sleeve and a hydraulic cylinder. The clamping sleeve and the hydraulic cylinder, which has internal teeth in axially spaced positions for corresponding tie bar notches, are axially adjustable and rotatable. In this way, the clamping position can be adjusted depending on mold height, in the manner of a bayonet closure.

BRIEF SUMMARY

The disclosure provides a mold closing unit and a method for locking force transmission elements on an injection molding machine in which, even when high forces are to be applied, both the locking mechanism for locking the tie bars to the mold carrier and also the unit for applying the closing force are reliably integrated into a common unit.

The mold closing unit has a stationary mold carrier and a mold carrier that is movable relative thereto, wherein these form between them a mold clamping space for receiving injection molds. The movable mold carrier is movable in a closing direction for the purpose of closing and opening the injection mold. The movable mold carrier can be moved into and out of mold closure of the injection mold by means of a mold drive device. The mold carriers are connectable to one another by means of at least one force transmission element, wherein the force transmission element is connected to one of the mold carriers. In its region associated with the other mold carrier, the force transmission element has a portion that is actuable for operative engagement. Provided at this other mold carrier is a locking device having a plurality of locking elements that are arranged radially in relation to the force transmission element and that, during mold closure of the parts of the injection mold, are configured to be brought into positively engaging operative connection with the actuable portion, for the purpose of applying a closing force. For this purpose, the locking device has at least one actuator that is movable in the closing direction and on which, during movement of the actuator, the locking elements are configured to be brought into and out of positively engaging operative connection with the actuable portion, transversely to the closing direction and in a forced guidance arrangement during mold closure. At the same time, the actuator is connected to at least one piston of a piston-and-cylinder unit, for the purpose of applying the closing force. The effect is that a compact structural unit can be formed at one side, which can be mounted on one of the mold carriers in a manner saving on space. At the same time, the forced guidance arrangement also ensures that even high forces can be applied reliably, even over many cycles of the injection molding machine.

The fact that the force transmission elements, which preferably take the form of tie bars, are completely detachable has the effect of fulfilling the structural preconditions for moving the mold clamping space—in which injection molds are received between the mold carriers during the injection molding of moldings—such that it comes completely free of the tie bars, which makes the mold clamping space and hence the injection mold more readily accessible. Nonetheless, a consistent application of force and hence a consistently high level of quality in the moldings can be achieved.

The forced guidance arrangement is a cam guide for the locking elements. The locking elements are clamping jaws that are configured to be brought into operative connection with the actuable portion of the force transmission element. The cam guide contributes to smooth performance of the locking movement, which operates reliably even under high forces. Moreover, the cam guide enables a high degree of precision and hence also a reproducible predefinability of locking.

A solution of this kind may be used both on a 3-plate machine and also on a 2-plate machine in which the unit for applying the closing force acts directly on one of the mold carriers, with the result that there is no additional need for a further support element.

Preferably, the linear movement of the actuator in the closing direction results in a movement of the locking elements transverse to the closing direction and radially in relation to the longitudinal extent of the force transmission element. This allows the locking movement to be derived in a simple manner from the actuator movement without the actuator being radially deformed in the locking direction. Because of the forced guidance of the locking elements at the actuator, positively engaging force-locking is nonetheless ensured in the locked condition.

Favorably, the cam guide is intended for rollers on which the locking elements are mounted. The rollers also contribute to smooth performance of the locking movement, increasing the desired high degree of precision and hence also the reproducible predefinability of locking.

Advantageously, the elements of the actuator that span the force transmission element in the condition in which it is locked to the mold carrier may, on the outside, form the cam guide for the locking elements, or alternatively form a roller track for rollers for the locking elements, wherein the locking elements are guided on these rollers in relation to the roller track. The multiple usability of the elements of the actuator, on the one hand, ensures that the locking elements are guided reliably, and on the other makes a space-saving construction of the complete locking unit possible.

Preferably, the locking elements are arranged in a manner saving on space, in recesses in the actuator that extend in the closing direction, which contributes to a compact construction and at the same time ensures that high forces are transmitted in the smallest of spaces. In order to further enhance the reliability of guidance of the locking elements, the locking elements may be forcibly guided on both sides on rollers in a movement channel, in order to further increase precision. This produces smooth actuation and hence enhanced procedural safety.

Advantageously, the locking elements are configured to be brought into their unlocked position in opposition to the force of resilient devices. This means that, in the absence of external force, the locking elements tend to move into the locked position, which contributes to additional operational safety.

As an alternative, it is advantageous for the locking elements to be brought into and out of operative connection with the actuable portion in a manner guided on double rollers, parallel to the closing direction. Parallel movement on double rollers results in a parallel mating of the locking elements with the corresponding similar locking elements of the actuable portion and minimization of the tilting movement of the locking elements, which reduces wear and thus lengthens the service life and/or reduces the need for maintenance.

Advantageously, the actuators and pistons are parts of an independent assembly, which in this respect may also be supplied to the machine in the form of an assembly. This has advantages not only for manufacture of the injection molding machine at the manufacturers plant but also when injection molding machines have to be maintained quickly and reliably at remote corners of the earth, since this makes it possible either to ensure that an assembly of this kind is kept in stock there or to deliver one there quickly. At the installation site, all that then needs to be done is to substitute the assembly for the existing assembly. Thus, preferably the actuator for locking the at least one force transmission element to the mold carrier, and the piston for applying the closing force are parts of an independent assembly.

In an advantageous embodiment, in the locked condition it is possible to apply a high pressure for generating the closing force or for a boosted opening of the injection mold by means of a piston of a piston-and-cylinder unit, and/or the piston for applying the closing force is actuable in opposition to the force of resilient elements. As a result, locking the mold carrier and the force transmission element by the actuator, and also the application of the closing force, are performed by a single assembly. At the same time, the spring damping can produce a protection against overload when the tie bar mates with the actuator, something which may occur for example if the mold height is set incorrectly. Thus, the entire injection molding machine is made operationally safe at the same time. The spring elements may additionally assist automatic return to the home position after the closing force has been removed.

The disclosure provides a method for locking a force transmission element to one of the mold carriers of the injection molding machine. For this method, the injection molding machine has the structural elements comprising a stationary mold carrier, a movable mold carrier, a mold drive device, and at least one force transmission element, wherein, during mold closure of the parts of the injection mold, an actuable portion of a force transmission element is locked with positive engagement to the other mold carrier by means of a plurality of locking elements of at least one locking device that are arranged radial in relation to the force transmission element. In the condition locked in this way, a closing force that acts by way of the force transmission element is applied. Because the locking elements on at least one actuator that is movable in the closing direction are configured to be brought into and out of positively locking operative connection with the actuable portion transversely to the closing direction and in a forced guidance arrangement during mold closure, and because the actuator within the locking device is at the same time connected to a piston of a piston-and-cylinder unit that applies the closing force, this does not only produce a compact structural solution. When the actuator is moved in the closing direction, the locking elements are guided in a cam guide that takes the form of a forced guidance arrangement, and these take the form of clamping jaws that are configured to be brought into operative connection with the actuable portion. The forced guidance arrangement makes it possible to bring the locking elements into the locking position in a manner that is sustainably reproducible and reliable, so that even after multiple cycles a high degree of precision can still be ensured. In addition, the cam guide contributes to smooth performance of the locking movement, which operates reliably even under high forces. Moreover, the cam guide makes possible a high degree of precision and thus also reproducible predefinability of the locking. At the same time, this has the effect that no positioning errors arise, and this consequently contributes to the operational safety and also to increasing the precision of the parts to be made.

Favorably, the linear movement of the actuator and the cam guide axially in the closing direction results in the movement of the locking elements, which is transverse to the closing direction and radial in relation to the longitudinal extent of the force transmission element. This contributes to the possibility of performing the locking reliably without any need for the deformation of the actuator which was required hitherto.

Preferably, the locking elements are forcibly guided on the actuator, mounted on rollers in the cam guide. In addition, or as an alternative, in an advantageous embodiment the locking elements may also be guided on both sides on rollers in a movement channel of the forced guidance arrangement. Each of these individually contributes to increasing the precision, since by this means the course of movement of the locking elements is predefinable predetermined. This results in exact locking and hence also, even under high forces, reliable force transmission and enhanced procedural safety. Preferably, the guide track for the rollers takes a form such that, in the locked condition, the rollers of the locking element are in one plane and cannot be displaced in the absence of a further external force.

The locking elements are favorably brought into their unlocked position in opposition to the force of resilient devices. This means that, in the absence of the action of an external force, the locking elements tend to move into their locked position, with the result that increased operational safety is ensured even if there are disruptions to the power supply during operation of the injection molding machine.

It is advantageous if the locking elements are brought into and out of operative connection with the actuable portion in a manner guided on double rollers parallel to the closing direction. This means that the locking elements perform a parallel displacement into and out of engagement with the actuable portion of the force transmission element. This ensures exact mating of the locking arrangements in one another, which is specifically advantageous in the case of a positively engaging connection and lengthens the service life of the mutually locking parts.

Preferably, in the locked condition a high pressure is generated by means of the piston for generating the closing force, and/or the piston for applying the closing force is actuated in opposition to the force of resilient elements. On the one hand, this contributes to the possibility of applying an additional high pressure for opening, if necessary, if the injection mold jams, and on the other the damping made possible by the resilient devices is particularly advantageous if incorrect inputs result in faulty operation. In this case, the machine is additionally relieved of load and protected.

BRIEF DESCRIPTION OF THE FIGURES

The disclosure is explained in more detail below with reference to a plurality of exemplary embodiments represented in the attached Figures, in which:

FIG. 11 shows a longitudinal section through the locking device according to FIG. 10, in a representation according to FIG. 5, in the closed, locked condition of the locking device, and FIG. 12 shows a representation according to FIG. 11, in an open, unlocked position of the locking device.

DETAILED DESCRIPTION

The disclosure is now explained in more detail by way of example, with reference to the attached drawings. However, the embodiments are only examples, which are not intended to restrict the inventive concept to a particular arrangement. Before the disclosure is described in detail it should be pointed out that it is not restricted to the respective structural parts of the device and the respective method steps, since these structural parts and method may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

Figure 1:
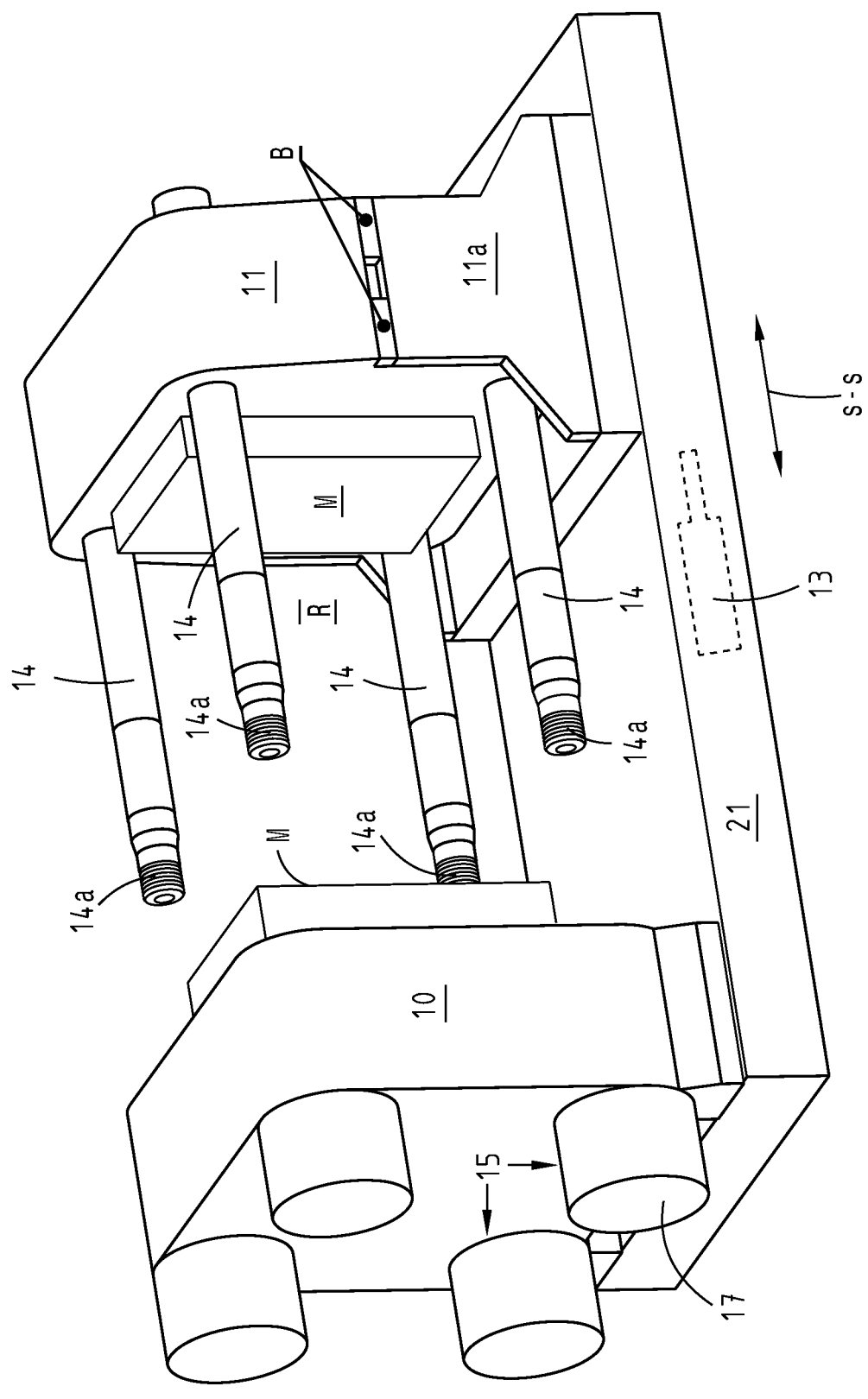
FIG. 1 shows a three-dimensional representation of a mold closing unit of a 2-plate machine, in a first exemplary embodiment.

The Figures show a mold closing unit for an injection molding machine for processing plastics and other plasticizable materials. FIG. 1 shows a schematic representation of a mold closing unit of this kind on a 2-plate machine in which there are arranged on the stationary mold carrier 10 a locking device 15 and a piston-and-cylinder unit 17 for applying the closing force. However, a solution of this kind may also be used on a 3-plate machine that has a support element for supporting a unit for applying the closing force.

The movable mold carrier 11 is arranged on a machine frame 21 such that it is movable in the closing direction s-s, wherein the movement can be performed for example by way of a mold drive device 13 arranged in the machine frame 21 and only indicated schematically—such as a rack-and-pinion drive, a hydraulic drive, a spindle drive or in another suitable way.

The movable mold carrier 11 is supported on the machine frame 21 by way of a table slider 11a and is secured to the table slider 11a by way of securing devices B. This results in an introduction of force that is optimized in terms of torque, based on the fact that the movable mold carrier is mounted in a manner that is vertically approximately centered.

The stationary mold carrier 10 and the movable mold carrier 11 define between them a mold clamping space R for receiving injection molds M, which may have different mold heights. The parts of the injection mold M are closed and opened in the closing direction s-s by the mold drive device 13 in order to cyclically produce and eject moldings in a mold cavity (not illustrated in the drawing) of the injection mold. The mold drive device 13 serves to bring the movable mold carrier 11 into and out of mold closure of the parts of the injection mold M that are received between the mold carriers.

Figure 2:
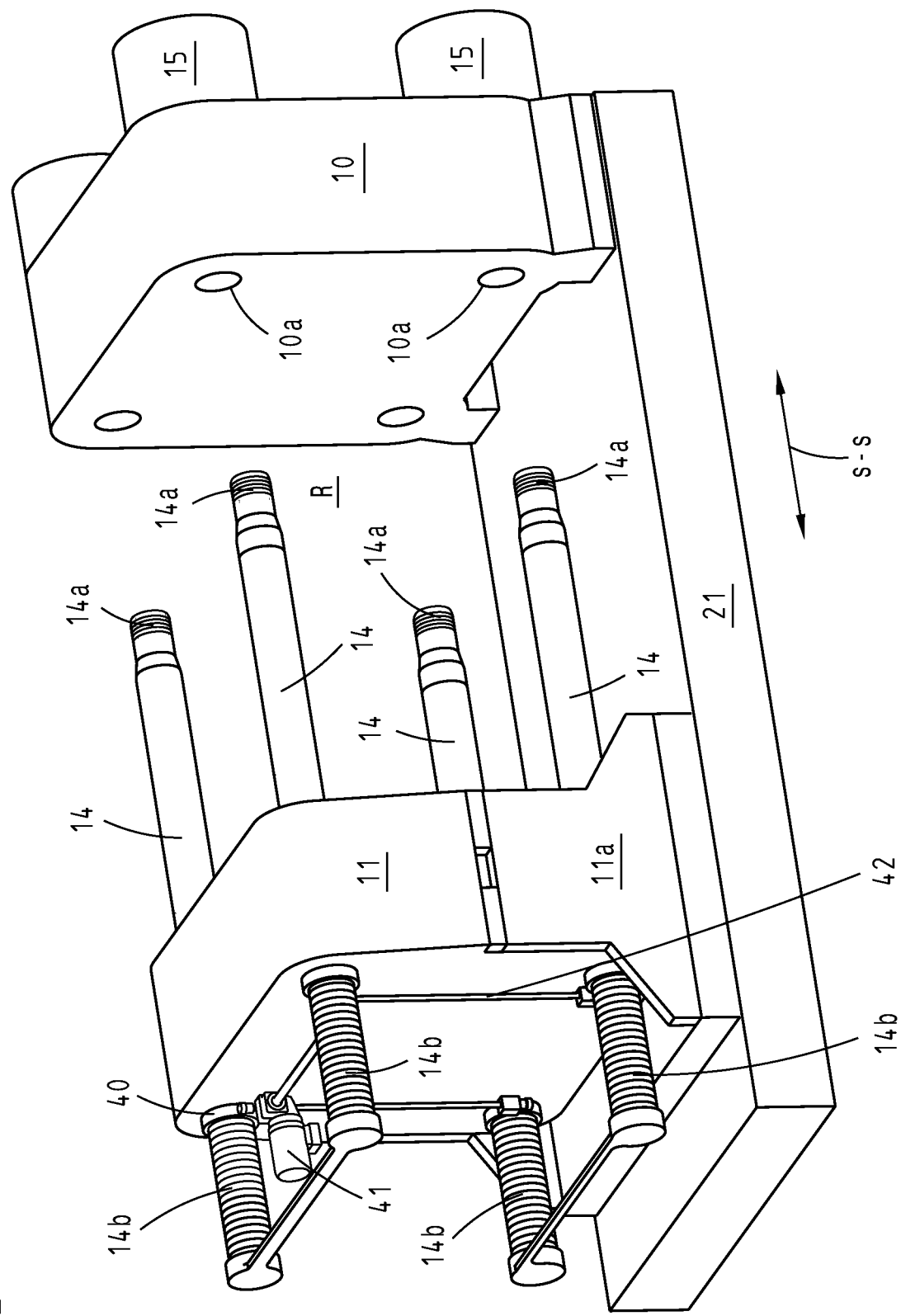
FIG. 2 shows a three-dimensional representation of the mold closing unit according to FIG. 1, looking toward the mold height adjustment on the movable mold carrier.

FIG. 2 shows, on the side of the movable mold carrier 11 remote from the mold clamping space R, the mold height adjusting device 42, which is intended and suitable for optimizing the closing paths and/or ensuring optimum position of the mold carriers during mold closure. It can be seen that in this region tie bars 14 as force transmission elements have a threaded portion 14b that is in operative connection with nuts 40. The nuts are positioned by way of a motor 41 and corresponding gear units, wherein a relative movement in the closing direction s-s is produced between the force transmission elements and the movable mold carrier 11.

According to FIGS. 1 and 2, in the exemplary embodiment the at least one force transmission element is formed by a plurality of tie bars 14, which are movable together with the movable mold carrier 11 and which clear the mold clamping space R when the injection mold is open. In order to perform mold closure, the actuable portions 14a of the tie bars 14 engage in receiving openings 10a in the stationary mold carrier in order that the positively locking connection between the mold carrier and the force transmission element can be made there, in a manner to be described below.

The at least one force transmission element—in the exemplary embodiment the plurality of ties bars 14—is connected to one of the mold carriers 11, 10—in the exemplary embodiment to the movable mold carrier 11. At the end remote from the one of the mold carriers, the force transmission elements have a portion 14a that is provided for operative engagement with the other mold carrier 10, 11—in this case the stationary mold carrier 10—and in this respect is actuable. Provided on the other mold carrier—i.e. the stationary mold carrier 10 in the exemplary embodiment—is a locking device 15 that, during mold closure of the parts of the injection mold M, is configured to be brought into positively locking operative connection with the actuable portion 14a of the at least one force transmission element for the purpose of applying a closing force.

The mold closing unit that is represented in FIGS. 1 and 2 is only part of the injection molding machine, since conventionally there is provided an injection molding unit (not illustrated in the drawing) by way of which the material to be plasticized is plasticized and injected into the mold cavity of the injection mold. The corresponding structure of an injection molding machine comprising the parts of mold closing unit and injection molding unit is known to those skilled in the art, however, so it is not discussed in more detail in this application.

Figure 3:
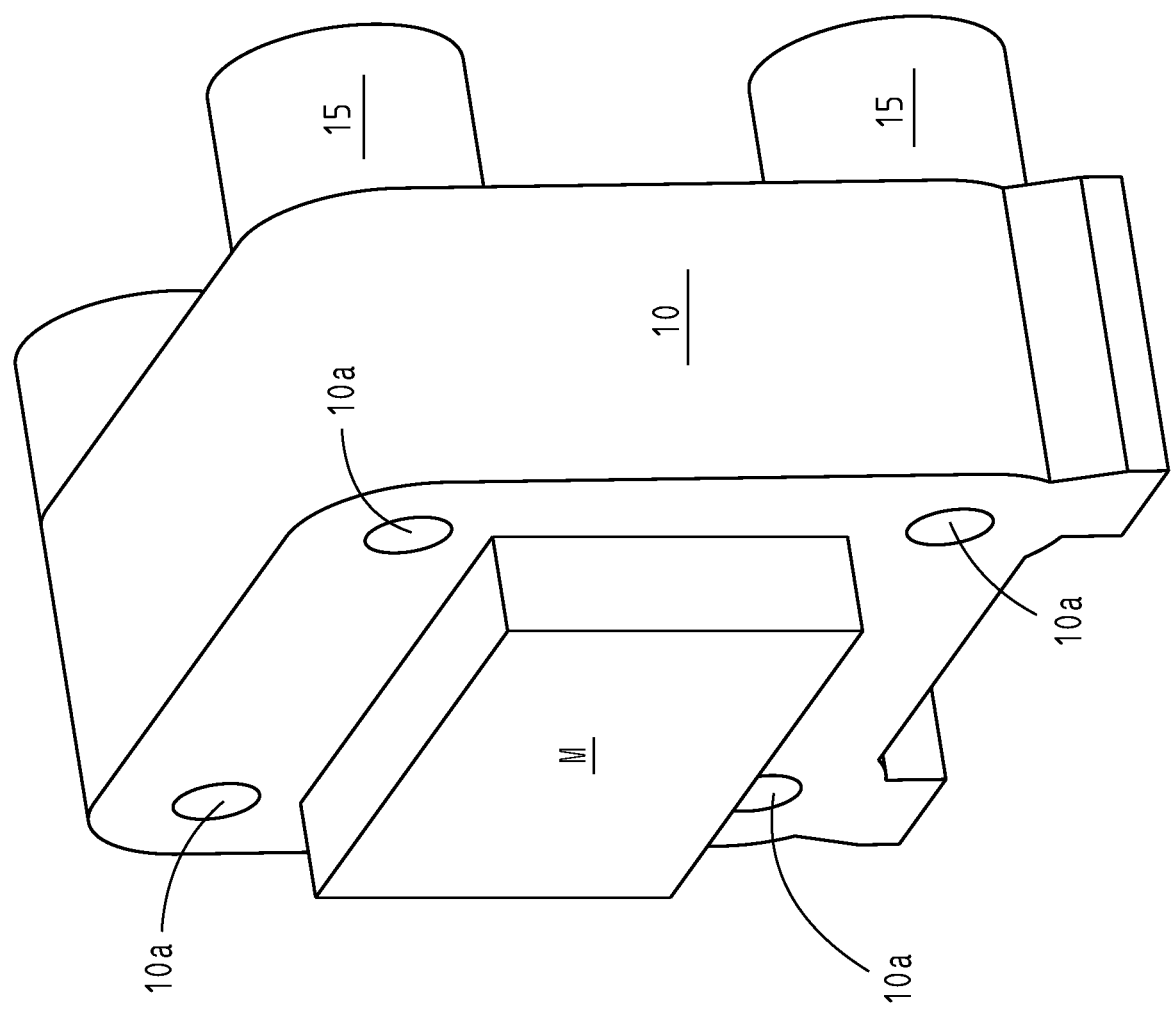
FIG. 3 shows a three-dimensional representation of the stationary mold carrier, with a view of the receiving opening for receiving the force transmission element.

FIG. 3 shows the stationary mold carrier 10 with the locking devices 15, wherein a locking device 15 is provided for each force transmission element or tie bar 14. The actuable portion 14a of the force transmission element engages in the receiving opening 10a in order that the locking device 15 can perform locking to the stationary mold carrier 10.

Figure 4:
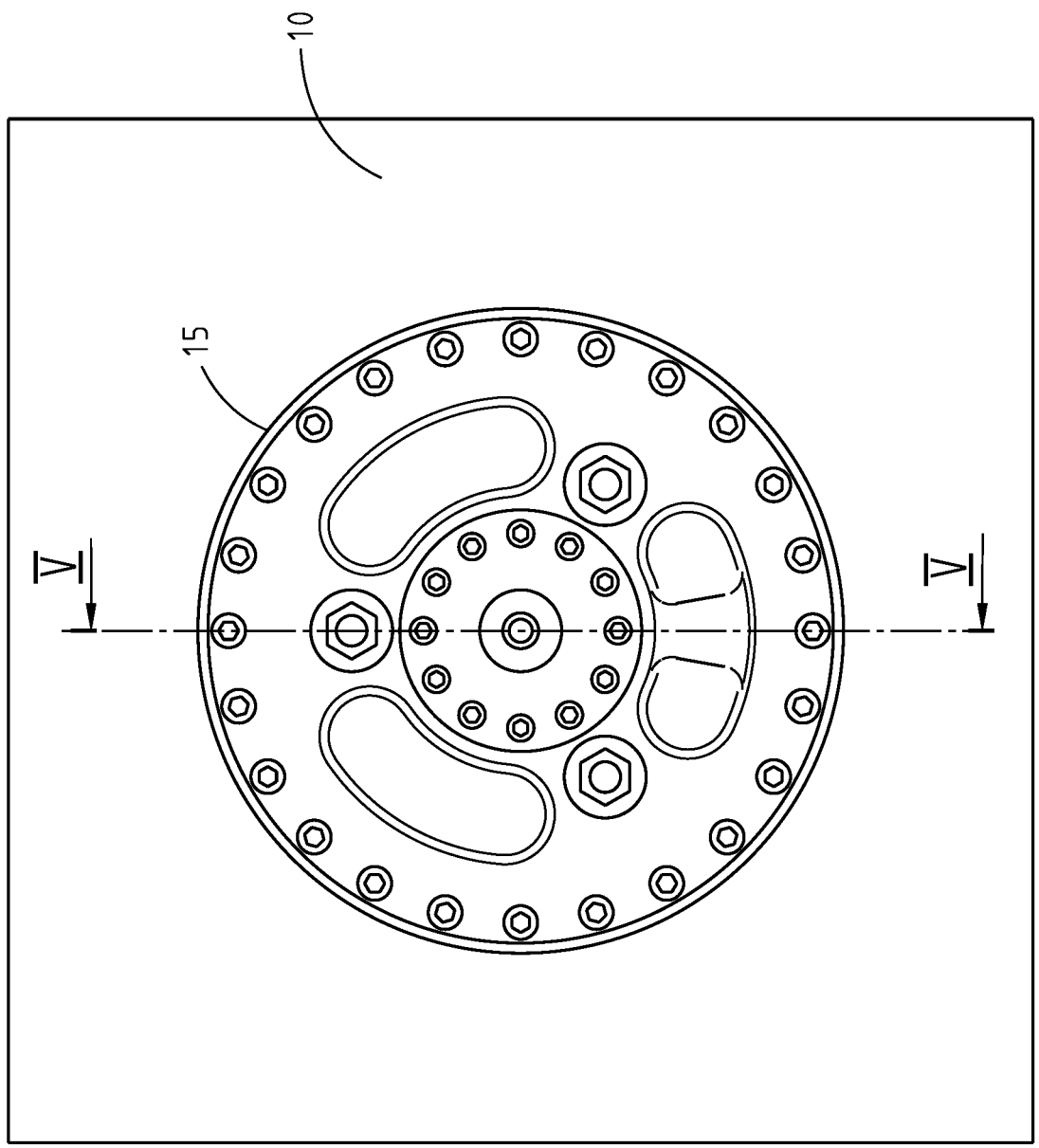
FIG. 4 shows an enlarged view of the locking device on the stationary mold carrier.
Figure 5:
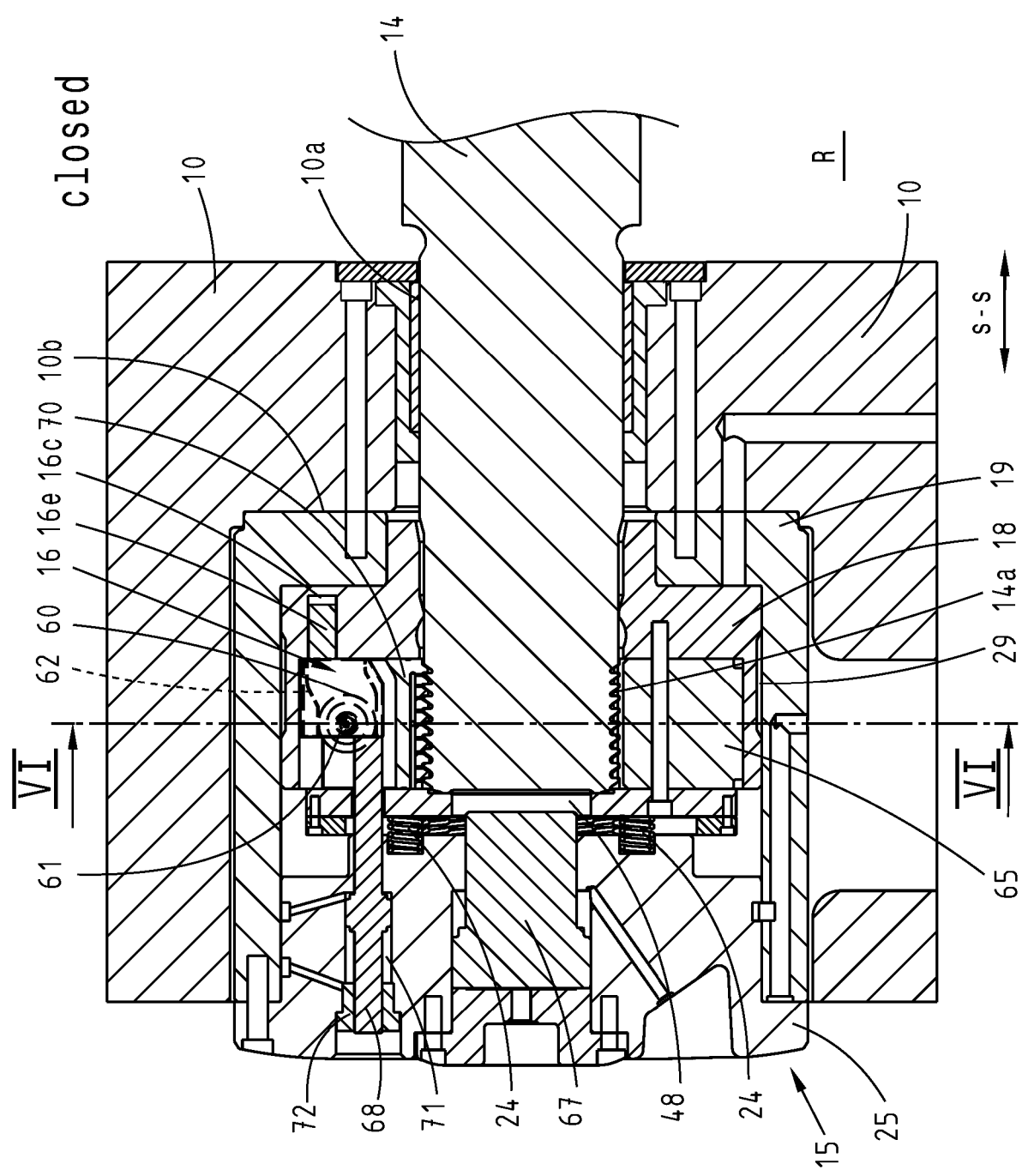
FIG. 5 shows a section along the line V-V in FIG. 4 in the closed, locked condition of the locking device.

The structure of the locking device 15 is explained in more detail below with the aid of FIGS. 4 to 9, referring to a first exemplary embodiment. FIG. 4 shows a view of the locking device 15, as seen from the side of the mold carrier 10 remote from the mold clamping space R. In the section of FIG. 5, along the line V-V in FIG. 4, for the closed—i.e. locked—condition of the locking device there is produced an engagement of locking elements 70, which preferably take the form of clamping jaws, in the actuable portions 14a of the force transmission element, which takes the form of a tie bar 14. In the exemplary embodiment, three locking elements are provided for each locking device 15, but in principle a different number of at least two and hence a plurality of locking elements is also possible. According to the exemplary embodiment, the actuable portion 14a and also the locking element 70 each have a toothing, and these are controllable in a manner positively locking in one another, in order thus to bring about positive locking. The locking device 15 has at least one actuator 16 that is movable in the closing direction s-s, and the locking elements 70 are configured such that, as a result of its movement, they are brought into and out of positively locking operative connection with the actuable portion 14a, transversely to the closing direction s-s in a forced guidance arrangement in the form of a cam guide 60 during mold closure. According to FIGS. 5 and 7, the actuator 16 is at the same time connected to at least one piston 18 of the piston-and-cylinder unit 17 for the purpose of applying the closing force.

The course of movement explained below is such that the linear movement of the actuator 16 in the closing direction s-s is convertible to the movement of the locking elements 70, which is transverse to the closing direction s-s and radial in relation to the longitudinal extent of the force transmission element.

Figure 6:
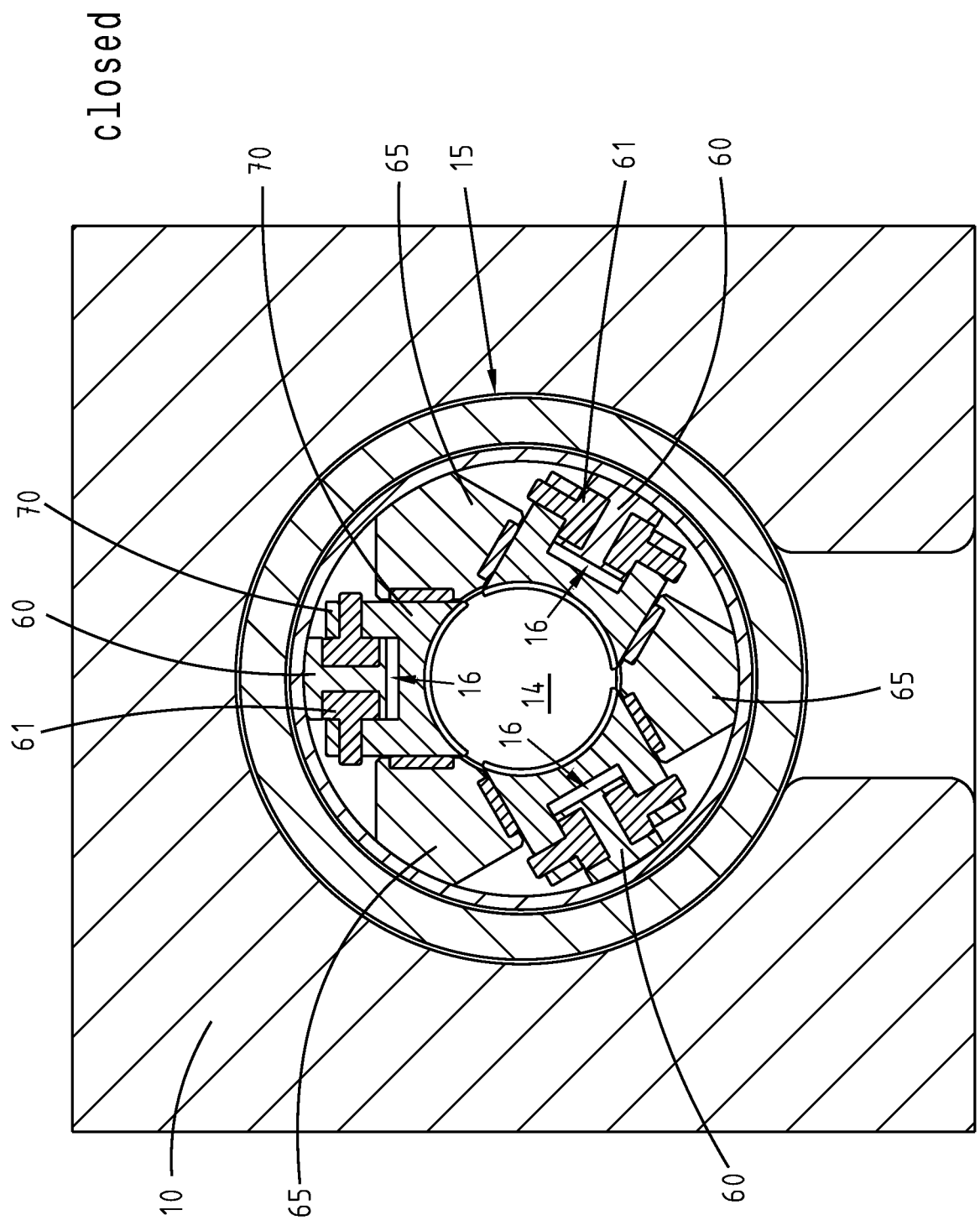
FIG. 6 shows a section along the line VI-VI in FIG. 5.
Figure 7:
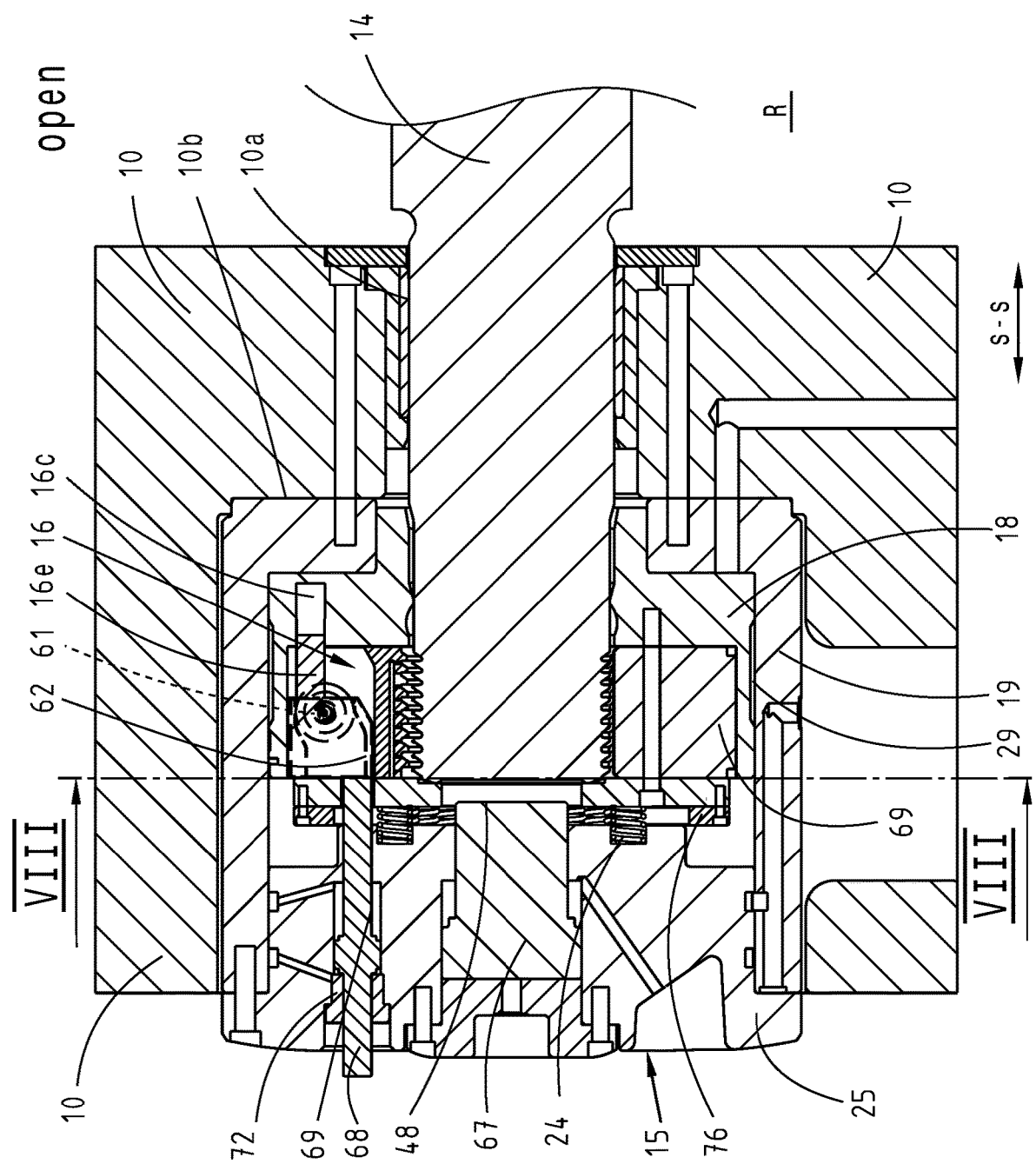
FIG. 7 shows a representation according to FIG. 5, in the open, unlocked condition of the locking device.

This becomes clear on comparing FIGS. 5 and 7:

FIG. 5 shows the locked position, in which the teeth of the locking elements 70 engage in the teeth of the actuable portion 14a. In principle, instead of a toothing any other preferably positively locking connections are also conceivable, such as circumferential grooves. The locking elements are coupled to rollers 61, as can be seen in FIG. 6, a cross section along line VI-VI in FIG. 5. The rollers 61 move in a cam guide 60, and in the closed condition they are held in their place by the position of the locking piston 68. In the closed condition, the locking piston 68 is in abutment at the right-hand end as seen in the Figure against the cylinder chamber 69 in FIG. 5, as a result of a pressure applied to the cylinder chamber 71. The locking piston 68 urges the chamber, resulting in hydraulic locking. In addition, the roller 61 is positioned in the roller track 62 in a plane that is arranged transversely, preferably at a right angle, to the locking direction, with the result that in the absence of external force the roller 61 is not displaced. This results in a mechanical lock provided in both end positions (lock closed and lock open).

In order to bring the locking elements 70 out of the locking position and into an open, unlocked position according to FIG. 7, as a result of applying pressure to the cylinder chamber 69 in FIG. 7 the locking piston 68 is brought into the opposing position, in which the locking piston comes into abutment against the cylinder cover 72. During this movement, the actuator 16 is moved linearly in the closing direction s-s, at the same time moving the rollers 61 in the cam guide 60. Preferably, at least one roller track 62 is provided for rollers 61. The rollers 61 and hence the locking elements 70 are moved by way of the roller track 62, radially outward and inward along the cam guide 60. The roller 61, which is preferably mounted on the locking element 70, fulfills the task of converting a sliding movement into a lower-wear rolling movement.

Figure 8:
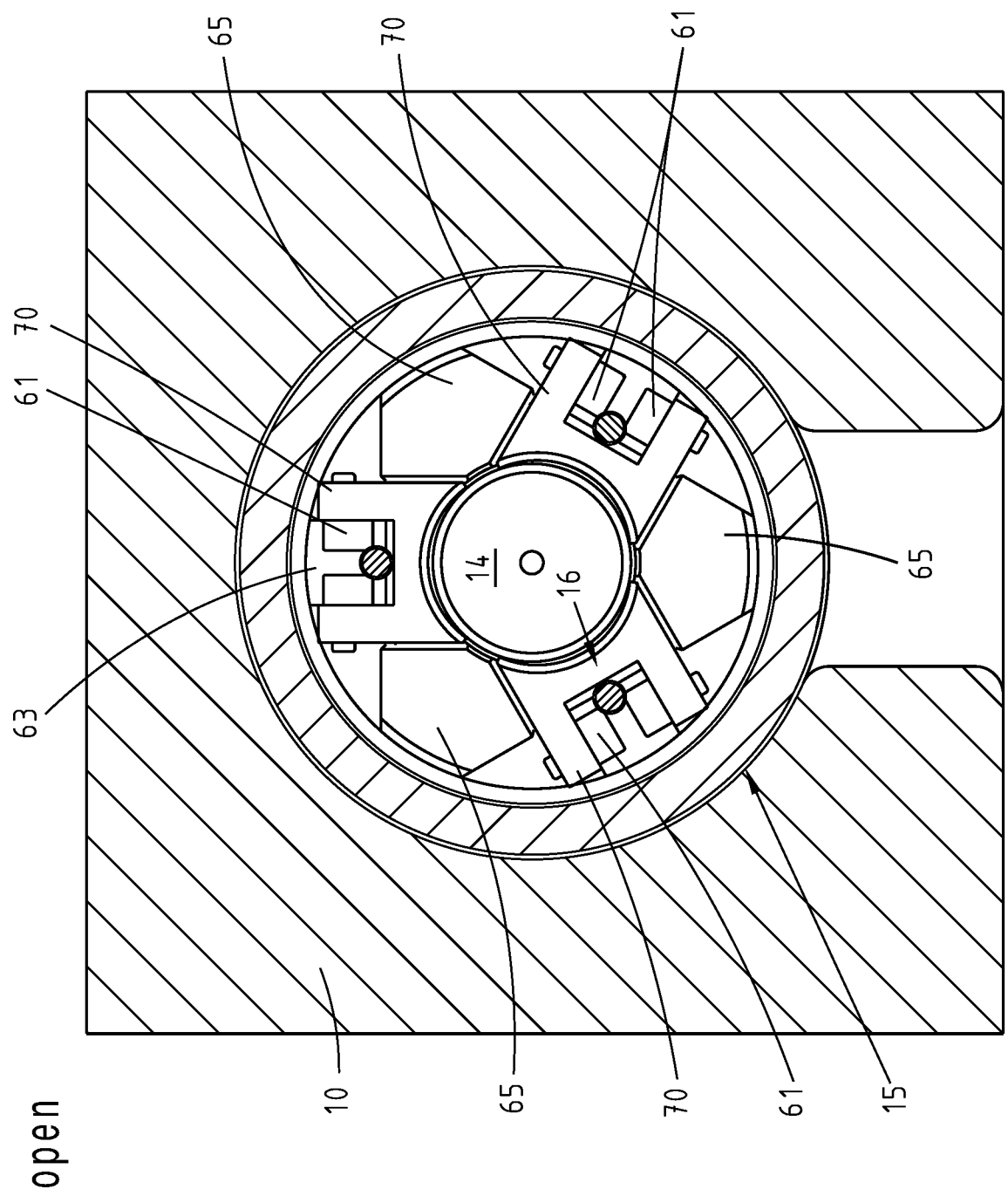
FIG. 8 shows a section along the line VIII-VIII in FIG. 7.

It can be seen in FIG. 7, by comparison with FIG. 5, that the roller 61 has been pushed radially farther out from the center line of the force transmission element. During this movement, because the rollers 61 are coupled to the locking elements 70, as can be seen in FIGS. 6 and 8, the rollers 61 have entrained the locking element likewise radially outward, with the result that the toothing of the locking element 70 has come out of engagement with the actuable portion 14a. During movement of the locking elements 70, these are guided on the jaw guides 65, illustrated in FIGS. 6 and 8, for a substantially radial movement. The jaw guide 65 is connected to the piston 18 and follows the high-pressure movement of the piston 18, but plays no part in the actual locking movement. The cooperation of locking piston 68, actuator 16, roller 61, locking element 70 and cam guide 60 results in a precise positioning or movement out of engagement of the teeth of the locking element and the actuable portion 14a.

According to FIGS. 5 to 8, the forced guidance arrangement is provided as a cam guide 60 for the locking elements 70 mounted on rollers 61. The locking elements take the form of clamping jaws that are configured to be brought into operative connection with the actuable portion 14a. The locking elements 70 movable in relation to the actuator 16 have the effect of forming actuator elements 16e with recesses 16c that span the force transmission element—i.e. the tie bar 14—in the condition locked to the mold carrier. Preferably in this case, the cam guide 60 for the locking elements 70 or a roller track 62 for rollers 61 of the locking elements is formed to the outside, on the actuator 16 in the region of its actuator elements 16e. The locking elements 70 themselves are preferably located in recesses in the actuator 16 that extend in the closing direction s-s. Preferably, the forced guidance arrangement guides the locking elements 70 on both sides on rollers 61 in a movement channel 63, ensuring enhanced precision and thus on the one hand reducing wear to the locking device. At the same time there is produced a compact, solid structure that reliably enables even high closing forces to be transferred.

In the exemplary embodiment, the recess 16c is made in the piston 18 in the form of a bearing bore. In the right-hand region, a pin is mounted on the actuator 16 as an actuator element 16e, and is guided in the bearing bore. In this way, the actuator 16 is guided in the right-hand region by the locking piston 68 and on the left-hand side by the actuator element 16e. The fact that guidance is on both sides prevents the actuator 16 from deforming under the force of the radial displacement of the locking elements 70. This ensures precise guidance of the actuator 16 and consequently equal and smooth radial movement of the locking elements 70.

When the force transmission element is introduced into the receiving opening 10a, the locking device according to FIGS. 5 and 7 takes a form such that, even in the event of incorrect input, the force transmission element does not impinge undamped on the root of the receiving opening 10a. In order to ensure damping there, various resilient devices in the form of springs are provided, such as the resilient devices 24, which cushion the locking piston 68.

Once locking has been performed according to FIGS. 5, 6, the closing force can be applied by way of the piston 18, which is received in the cylinder 19 in the locking device 15. The entire unit, which here also includes the piston-and-cylinder unit for applying the closing force, is locked on the side facing away from the mold clamping space by way of a cylinder cover 25. It can be seen in FIG. 5 that the cylinder cover 25 is secured directly to the cylinder 19, and the entire locking device 15 is itself secured by way of securing devices at the root 10b of the opening in the stationary mold carrier, which receives the locking device.

In FIGS. 5-8, a piston 67 fulfills the conventional function of opening under high pressure if the injection mold M does not open readily, for example as a result of the mold halves jamming. Movement of the cam guide 60 and thus also radial movement of the locking elements 70 is effected in FIGS. 5-8 by the additional pistons 68—of which there are three in the exemplary embodiment.

Figure 9:
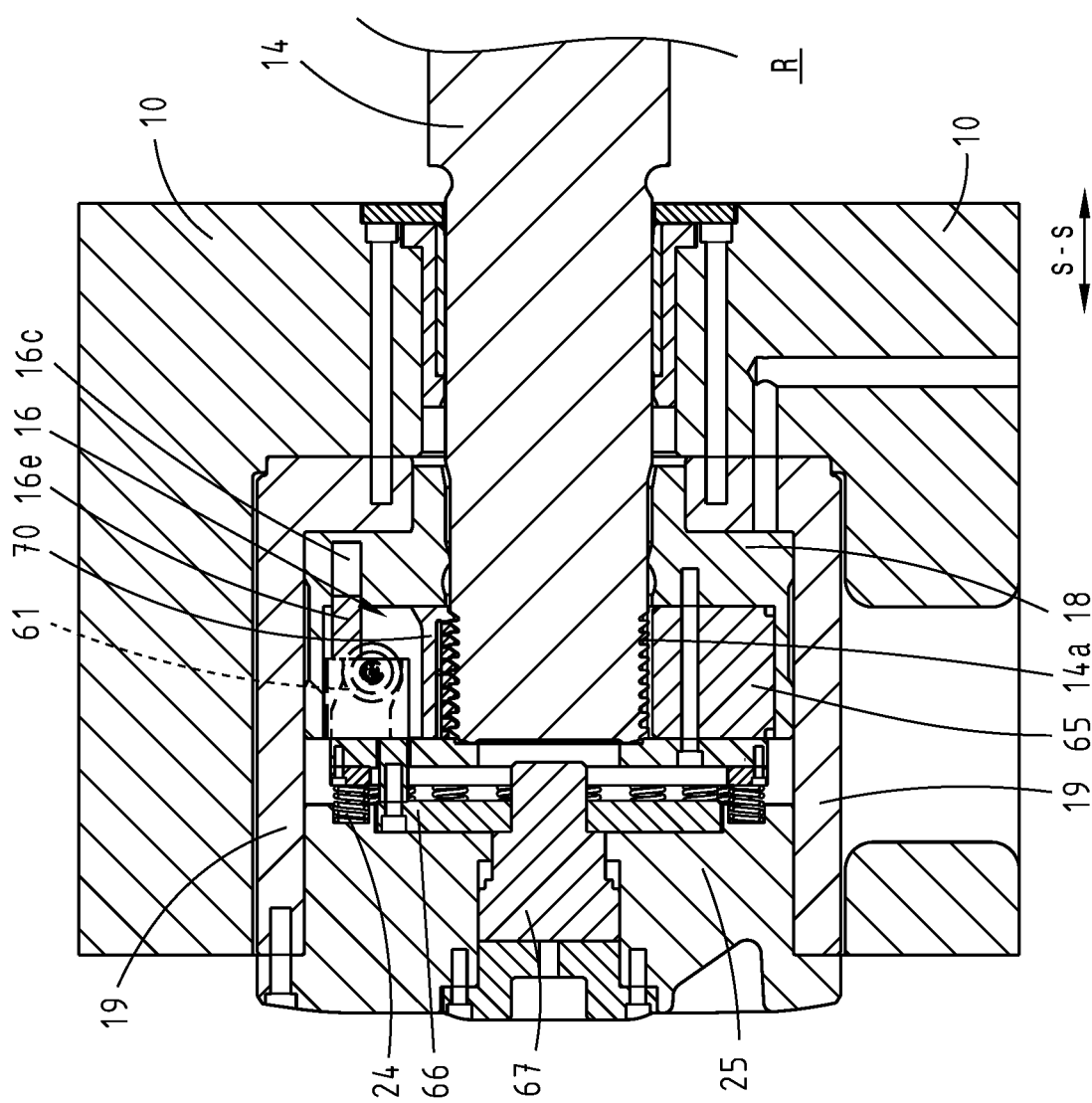
FIG. 9 shows a section through a locking device in a representation according to FIG. 5, in an alternative embodiment having a connection plate.

In FIG. 9, a connection plate 66 provides the possibility of using the piston 67 for high-pressure opening also to generate the movement of the locking elements 70. Only once the cam guides 60 have been moved to the right by the piston 67 (and the locking elements have been unlocked), the piston 67 comes into abutment against the tie bar 14, which it can accordingly push outward to the right under a relatively high force.

Figure 10:
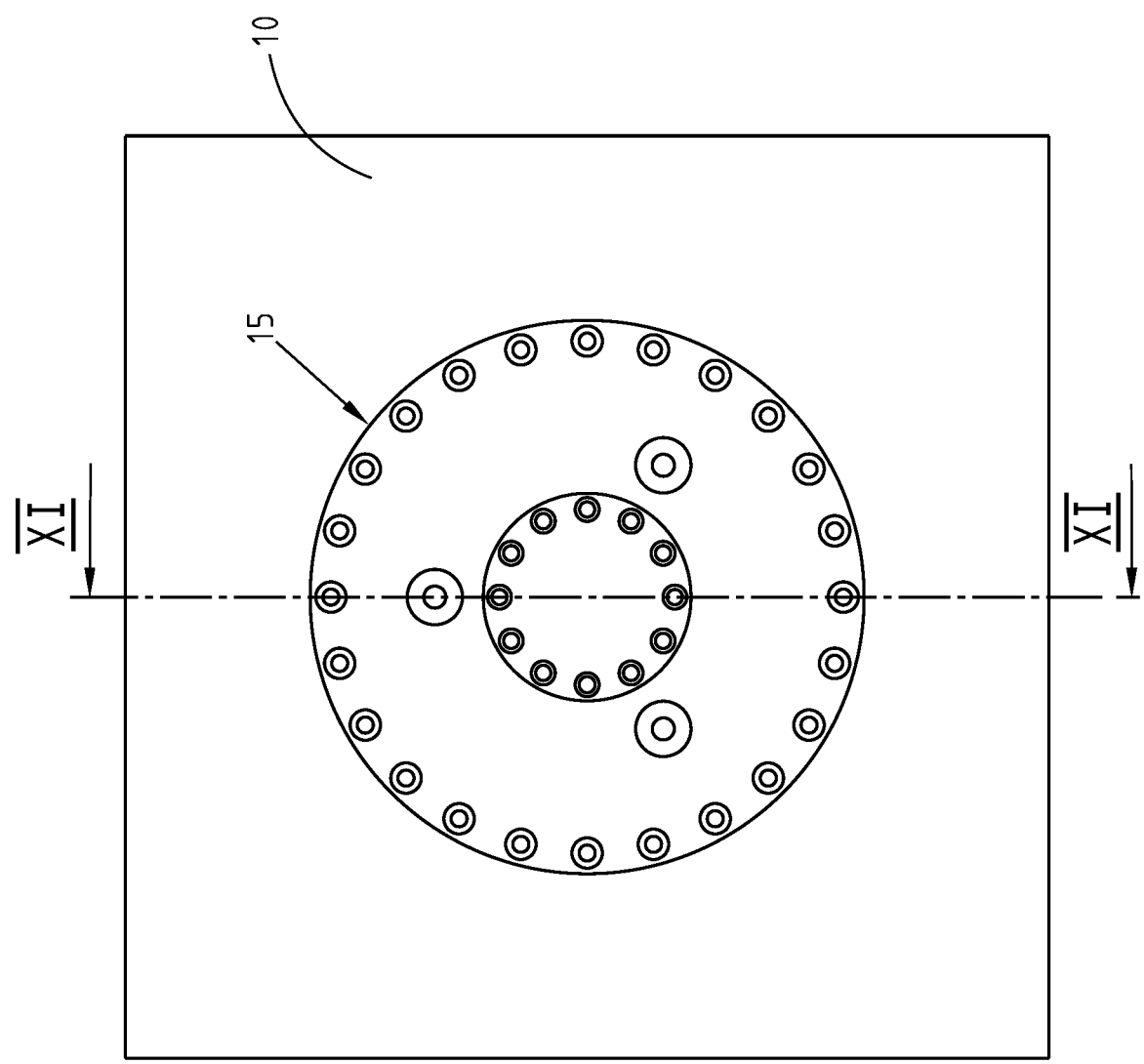
FIG. 10 shows a view of a locking device according to FIG. 3, in a further exemplary embodiment.

The exemplary embodiment of FIGS. 10 to 12 shows an alternative configuration of the locking elements 70, in particular an alternative guidance arrangement. Here, the locking elements 70 are guided on double rollers 75, each with their own cam guide. A comparison between FIGS. 11 and 12—i.e. between the closed, locked position according to FIG. 11 and the open, unlocked position according to FIG. 12—shows that there is mounted on a central piston 67 the connection plate 66, which for its part guides the actuator elements 16e. Formed on the actuator elements 16e are, for each double roller 75, corresponding roller tracks 62 such that when the piston 67 is actuated the double rollers 75 jointly move radially outward. Because the cam guides are identical in form, this produces a parallel displacement of the locking elements 70 such that they are configured to be brought or put in position into and out of operative connection with the actuable portion 14*a* exactly parallel to the closing direction s-s.

Preferably, the movement into the open position is such that the locking elements 70 are brought into their unlocked position, in opposition to the force of resilient devices 64. This means that the locking elements are always urged toward returning to the locked position, resulting in passive safety—that is to say that if the power supply fails the locking device locks automatically and brings the locking element 70 into operative engagement with the actuable portion 14*a* of the force transmission element.

A common feature of all embodiments is that the actuator 16 and the piston 18 are parts of an independent assembly—that is to say that the locking device 15 is an assembly that may be made beforehand at the manufacturers or even kept readily in stock in remote parts of the world in order where necessary to substitute them rapidly on the injection molding machine.

In addition, in the locked condition of the locking device 15 a high pressure can where necessary be applied, by means of the piston 18, for the purpose of generating the closing force. Preferably, the piston 18 is configured to be actuated in opposition to the force of resilient elements 24, for the purpose of applying the closing force. If additional opening under high pressure is required, for example because the injection mold has jammed, then the piston 67 can be additionally used for this purpose.

According to the method, the injection molding machine operates such that the at least one force transmission element, which in the exemplary embodiment is formed by a plurality of tie bars 14, but which may also be formed for example by U-shaped elements guided around the mold clamping space R, is connected to one of the mold carriers 11, 10—in the exemplary embodiment the movable mold carrier 11. Provided at its end spaced from this mold carrier is a portion 14*a* that is associated with the other of the mold carriers 10, 11—in the exemplary embodiment the stationary mold carrier 10—and is actuable for operative engagement. On mold closure of the parts of the injection mold M, the actuable portion 14*a* is locked to the other mold carrier with positive engagement by means of a plurality of locking elements 70, which are arranged radially in relation to the force transmission element, of at least one locking device 15. In the condition locked in this way, a closing force that acts by way of the force transmission element is applied by means of a piston-and-cylinder unit 17.

At least one actuator 16 that is movable in the closing direction s-s, the locking elements 70 are configured to be brought into and out of positively locking operative connection with the actuable portion 14*a*, transversely to the closing direction and in a forced guidance arrangement, which takes the form of a cam guide 60, during mold closure. Within the locking device 15, the actuator 16 is at the same time connected to a piston 18 of the piston-and-cylinder unit 17, this piston 18 applying the closing force. According to FIGS. 5 to 8 and 11, 12, the linear movement of the actuator 16 in the closing direction s-s is converted into a movement of the locking elements 70 transverse to the closing direction s-s and radial to the longitudinal extent of the force transmission element. As a result, on the one hand the actuator 16 is not deformed, and on the other the locking elements 70 can be positioned precisely, such that the teeth of the locking elements 70 or indeed another geometric formation can be introduced into the correspondingly similar teeth or formation of the actuable portion 14*a* of the force transmission element or removed therefrom again.

During movement of the actuator 16, the locking elements 70 mounted on rollers 61 are guided on the actuator in the cam guide 60, in the closing direction s-s. Preferably, the movement of the locking elements is performed over rollers 61 that are guided on both sides in a movement channel 63 of the forced guidance arrangement. This makes possible a compact structure but also exact guidance, which contributes to reducing wear to the locking elements 70 and also to being able to transfer correspondingly high forces reliably.

Preferably, the locking elements 70 are brought into their unlocked position in opposition to the force of resilient devices 64, as illustrated in FIGS. 11 and 12. This results in an automatic return to the locked position and hence passive safety if the power supply fails.

In a preferred embodiment, the locking elements 70 according to the exemplary embodiment of FIGS. 10 to 12 are configured to be brought into and out of operative connection with the actuable portion 14*a* on double rollers 75, parallel to the closing direction s-s. This means that a parallel displacement of the locking elements into and out of operative connection is performed, with the result that precise positioning in the locked position is possible, with the advantages already indicated above.

In the locked condition, the piston 18 generates a pressure for generating the closing force. The piston 18 may also preferably be actuated in opposition to the force of resilient elements 24 for the purpose of applying the closing force.

The actuator 16 that is mounted to be axially movable on the mold carrier in the closing direction s-s has a receiving opening, into which the portion that is actuable by the actuator 16 is introduced in the closing direction.

Overall, there is produced a precise and also compact locking device that can transfer even high forces reliably and also over the long term. Paired with the movable mounting of the locking elements 70 on the actuator 16, the result is good guidance by the actuator but at the same time a precise transfer of the locking elements into and out of operative engagement with the actuable portion 14*a* of the force transmission elements.

It goes without saying that this description may be subject to the most diverse modifications, changes and adaptations which are within the range of equivalents to the attached claims.

The invention claimed is:

1. A mold closing unit for an injection molding machine for processing plastics and other plasticizable materials, comprising:
   a stationary mold carrier,
   a movable mold carrier that is movable relative to the stationary mold carrier and forms, between itself and the stationary mold carrier, a mold clamping space for receiving injection molds and is movable in a closing direction (s-s) for closing and opening parts of an injection mold,
   a mold drive device configured to bring the movable mold carrier into and out of a mold closure of the parts of the injection mold (M) which are received between the movable mold carrier and the stationary mold carrier, which together form mold carriers,
   at least one force transmission element, which is connected to one of the mold carriers and has at an end spaced from the one of the mold carriers an actuable por-tion associated with the other of the mold carriers and configured to be actuable for an operative engagement, at least one locking device associated with the other mold carrier and comprising a plurality of locking elements that are arranged radially in relation to the at least one force transmission element and which, during mold closure of the parts of the injection mold, are configured to be brought into positively locking operative connection with the actuable portion for applying a closing force, wherein the at least one locking device comprises at least one actuator (16) that is movable in the closing direction and on which, during movement of the at least one actuator, the locking elements are configured to be brought into and out of positively locking operative connection with the actuable portion, transversely to the closing direction in a forced guidance during mold closure, and wherein at the same time the at least one actuator is connected to at least one piston of a piston-and-cylinder unit, for applying the closing force, wherein the forced guidance is a cam guide for the locking elements, which take the form of clamping jaws being configured to be brought into operative connection with the actuable portion.

2. Mold closing unit as claimed in claim 1, wherein a linear movement of the at least one actuator in the closing direction is configured to be converted into a movement of the locking elements transverse to the closing direction and radially in relation to a longitudinal extent of the at least one force transmission element.

3. Mold closing unit as claimed in claim 1, wherein the locking elements are mounted in the cam guide on rollers.

4. Mold closing unit as claimed in claim 1, wherein the at least one actuator comprises actuator elements that are configured to span the at least one force transmission element in the condition in which it is locked to the mold carrier and to form, on their outside, the cam guide for the locking elements.

5. Mold closing unit as claimed in claim 4, wherein the actuator elements form a roller track for the rollers of the locking elements.

6. Mold closing unit as claimed in claim 1, wherein the forced guidance is configured to guide the locking elements on both sides on rollers in a movement channel.

7. Mold closing unit as claimed in claim 1, wherein the locking elements are configured to be brought into their unlocked position in opposition to the force of resilient devices.

8. Mold closing unit as claimed in claim 1, wherein the locking elements are configured to be brought into and out of operative connection with the actuable portion in a manner guided on double rollers, parallel to the closing direction.

9. Mold closing unit as claimed in claim 1, wherein the at least one actuator for locking the at least one force transmission element to one of the mold carriers, and the piston for applying the closing force are parts of an independent assembly.

10. closing unit as claimed in claim 1, wherein in a locked condition a high pressure for generating the closing force is configured to be generated by the piston.

11. Mold closing unit as claimed in claim 1, wherein the piston for applying the closing force is actuable in opposition to the force of resilient elements.

\* \* \* \* \*